Sept. 18, 1951  R. R. BEEZLEY  2,568,109
MEANS AND METHODS FOR LOCATING AND INDICATING
TOP DEAD CENTER ON ENGINES
Filed May 5, 1947  4 Sheets-Sheet 1
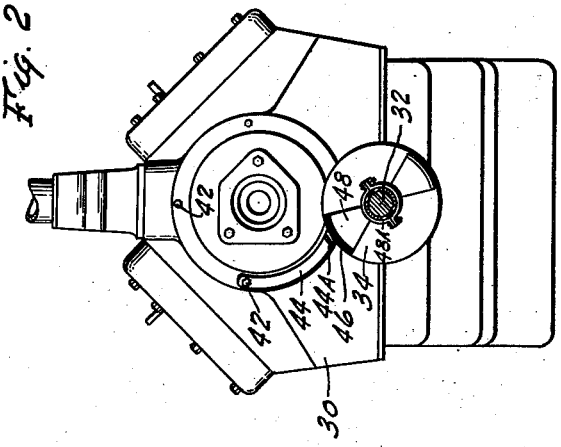
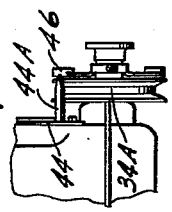
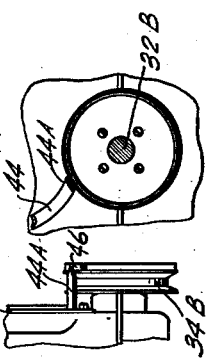
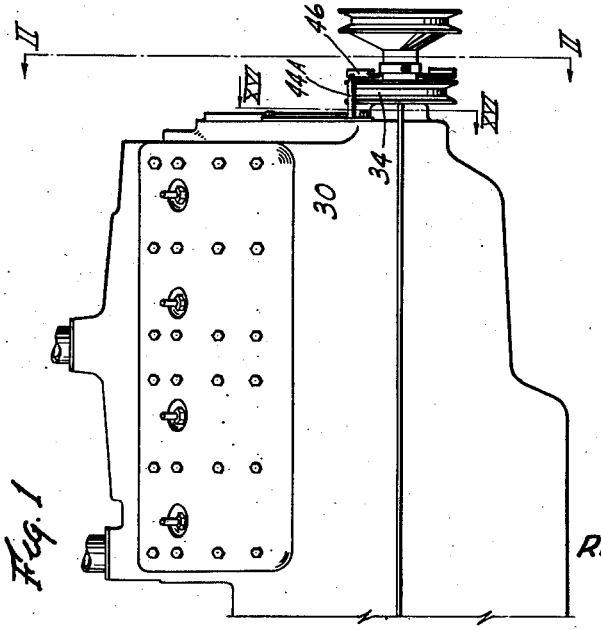
INVENTOR
REGINALD R. BEEZLEY

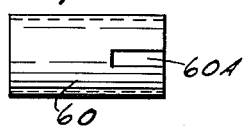
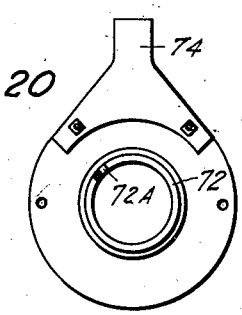
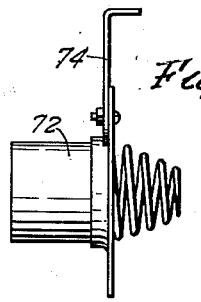
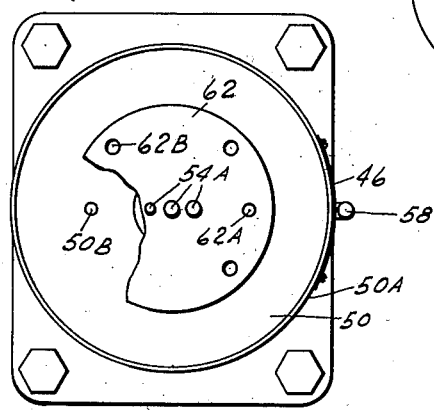
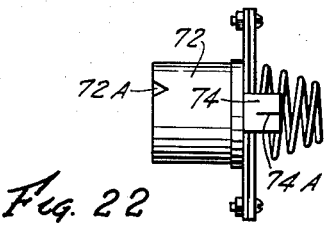
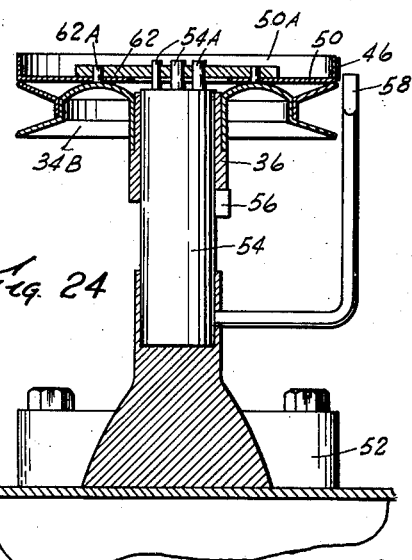
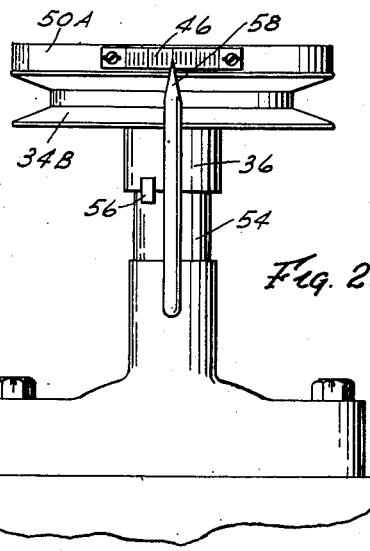
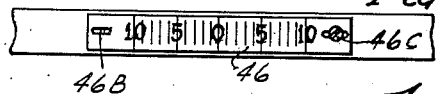
INVENTOR
REGINALD R. BEEZLEY Sept. 18, 1951 R. R. BEEZLEY 2,568,109
MEANS AND METHODS FOR LOCATING AND INDICATING
TOP DEAD CENTER ON ENGINES
Filed May 5, 1947 4 Sheets-Sheet 3
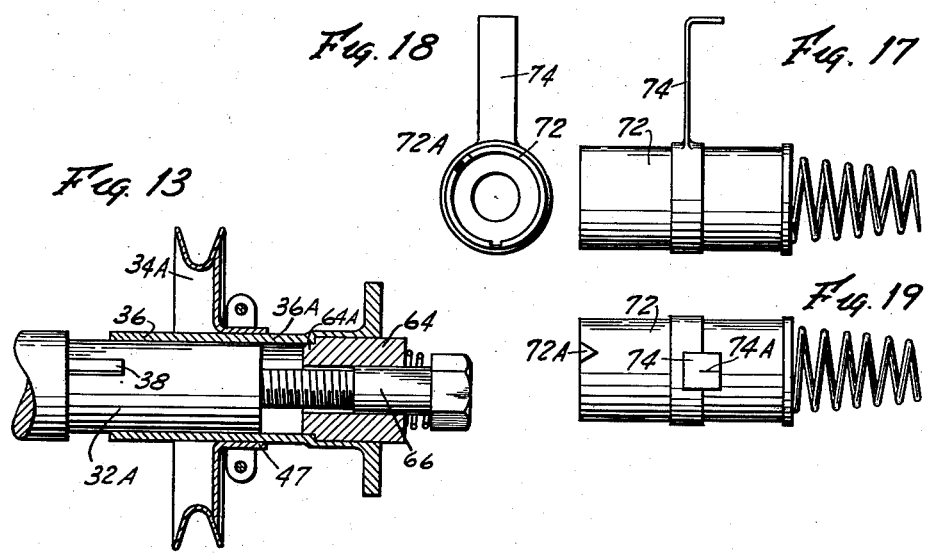
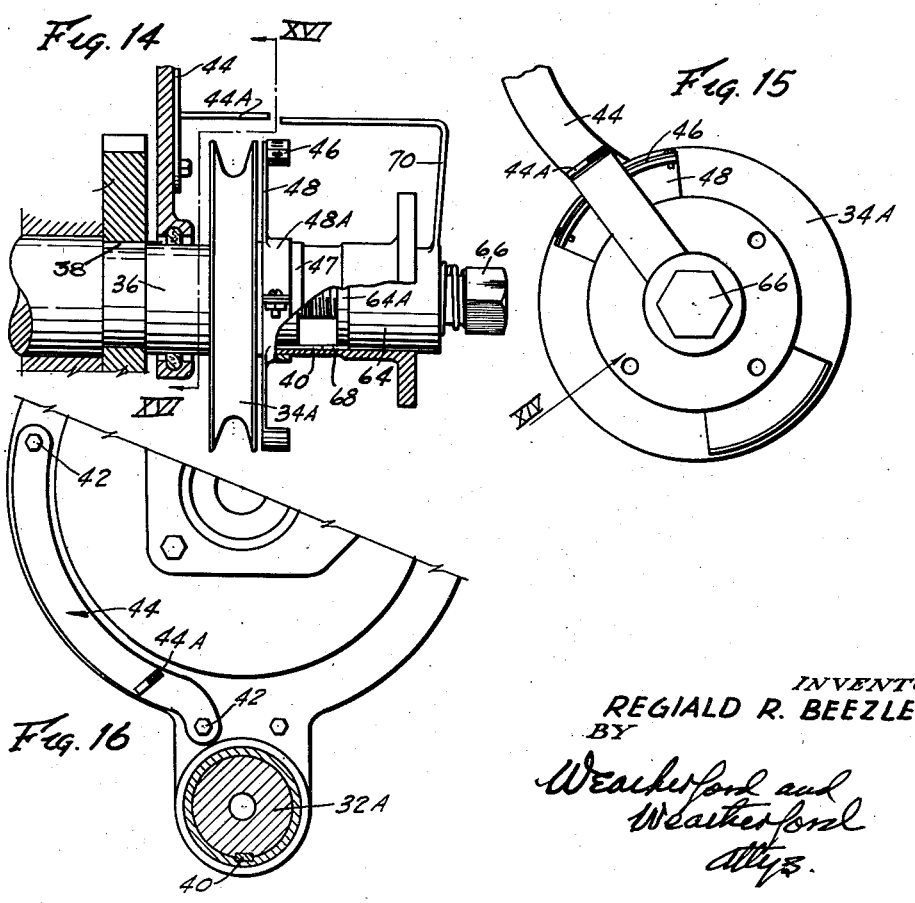
INVENTOR
REGIALD R. BEEZLEY
BY
Weatherford and
Weatherford
attys.

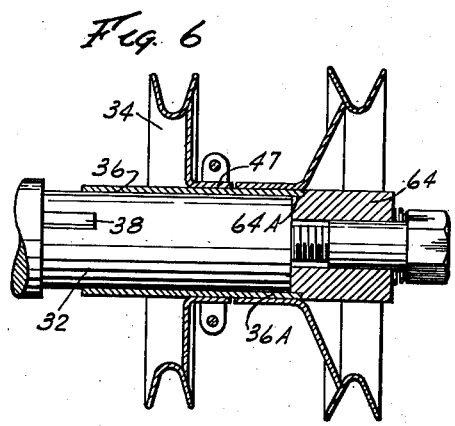
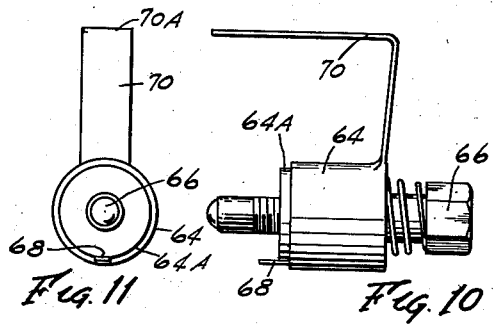
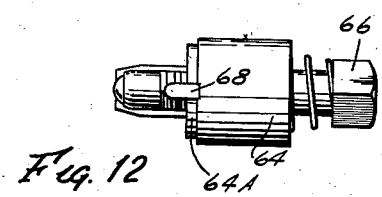
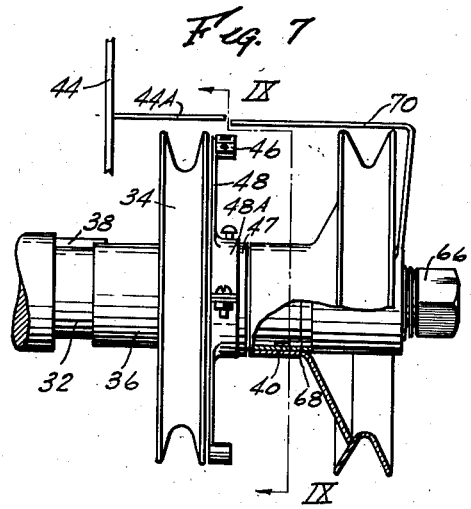
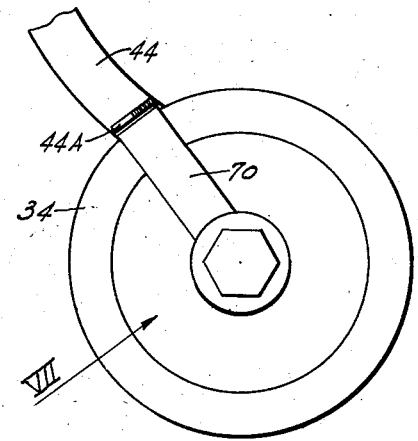
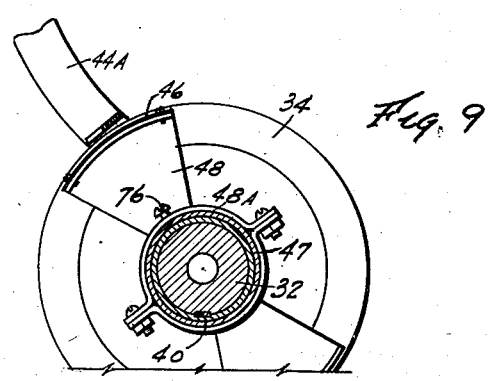

Patented Sept. 18, 1951

2,568,109

UNITED STATES PATENT OFFICE 2,568,109

MEANS AND METHODS FOR LOCATING AND INDICATING TOP DEAD CENTER ON ENGINES

Reginald R. Beezley, Memphis, Tenn.

Application May 5, 1947, Serial No. 746,068

6 Claims. (Cl. 116—124)

This invention relates to means and methods for determining and indicating top dead center of one of the pistons of an internal combustion engine to enable a mechanic to make proper setting of the distributor and other mechanisms which control the instant of firing in the related cylinder and inherently that of the other cylinder.

Internal combustion engines, particularly of modern high speed types, have distributors which close firing circuits to the spark plugs of the engine cylinders in proper succession, which distributors can be and must be set or adjusted to cause the firings to take place at the proper time and which if properly set for only one cylinder inherently are properly set for all. Most makes of automobiles have some means for indicating the top dead center of one piston designated as the number one cylinder and a number one distributor point related thereto. The Ford automobile has no such top dead center indicator and it is necessary to remove a motor head in order to determine top dead center, and even with this accomplished, in common with other makes, has no accurate means for determining the proper amount of advance of the spark.

The present invention is directed primarily toward means for meeting this situation in the Ford and other engines, and for so equipping such engines that checks and adjustments may readily be made from time to time. In the Ford engine, which has been selected for purposes of illustration, accuracy of mass production and lack of changes over a period of years in the construction of certain parts made use of in connection with the present invention has facilitated the application of the invention to the several slightly modified types shown.

The primary object of the invention is to establish a readily accessible and easily visible indicating pointer and cooperating dial markings which may be brought into register to indicate top dead center of one of the pistons of the engine, preferably the piston of the number one cylinder.

A further object is to provide such a pointer and cooperating markings which are adapted to indicate top dead center and degrees or amounts of advancement or retardation of the piston with relation to top dead center.

Further objects are:

To provide means and methods of determining the proper location of the markings on a movable part of the engine with relation to a preestablished pointer on a fixed part of the engine;

To provide means for making final accurate adjustment of the markings;

To provide means for establishing the locations of such markings where conditions require, or make it advisable, that such markings be established on parts temporarily removed from the engine.

The means by which the foregoing and other objects are accomplished and the manner of their accomplishment will readily be understood from the following specification upon reference to the accompanying drawings, which illustrate a series of three engines, all of which include features in common which may be employed to position top dead center indicator means, and in which drawings:

Fig. 1 is a side elevation of a V-eight engine with dual pulleys showing the timing device thereon.

Fig. 2 is a corresponding end elevation with one pulley cut away on the line II—II of Fig. 1.

Fig. 3 is a fragmentary side elevational view showing installation of the timing device on an earlier type of the same engine of single pulley type.

Fig. 4 is an additional fragmentary side elevational view showing installation on a still earlier type of engine having a modified type of pulley; and Fig. 5 a related end elevation.

Figs. 6, 7, 8 and 9 are views on a larger scale of the dual pulley portion of the engine shown in Figs. 1 and 2, showing a step in accomplishing the installation;

Fig. 6 being a sectional plan view;

Fig. 7 a side elevational view, looking in the direction of the arrow VII;

Fig. 8 an end elevational view showing a fragmentary portion of the indicator pointer in the background; and Fig. 9 a sectional end elevational view taken on the line IX—IX of Fig. 7.

Figs. 10, 11 and 12 are views of the top dead center finder adapted for use in connection with the indicator pointer to determine when the number one piston of an engine of the types shown in Figs. 1 and 3 has been brought to top dead center;

Fig. 10 being a side elevation of the finder;

Fig. 11 an end elevation; and

Fig. 12 an inverted plan view.

Figs. 13, 14 and 15 are views corresponding to Figs. 6, 7 and 8 showing use of the finder in installing the indicator on the single pulley type of engine corresponding to Fig. 3;

Fig. 13 being a sectional plan view;

Fig. 14 a side elevational view looking in the direction of the arrow XIV;

Fig. 15 a corresponding end elevational view showing a fragmentary portion of the indicator pointer in the background.

Fig. 16 is a fragmentary sectional end elevation typical of all the engines, taken as on the line XVI—XVI of Fig. 14, showing an indicator pointer mounted on an engine.

Figs. 17, 18 and 19 are views of a finder for use with engines of the type shown in Fig. 1 with the pulleys removed;

Fig. 17 being a side elevational view;

Fig. 18 an end elevation; and

Fig. 19 a plan view.

Figs. 20, 21 and 22 are views of a finder for use with engines of the type shown in Fig. 3, with the pulley removed;

Fig. 20 being an end elevational view;

Fig. 21 a side elevational view; and

Fig. 22 a plan view.

Figs. 23, 24 and 25 are views of a bench jig used in connection with equipping the third type of pulley with an indicator dial with such pulley in place on the jig, the jig being usable if desired when equipping either of the other type pulleys;

Fig. 23 being a plan view;

Fig. 24 a sectional elevational view; and

Fig. 25 a corresponding side view.

Figs. 26 and 27 are respectively a plan view and section substantially full size of one of the indicator dials.

Fig. 28 is a side view of an adapter sleeve.

In these views the crank shafts of the first two types are of the same diameter, but the second projects less beyond the cylinder block than the first, whereas the crank shaft of the third type is of slightly smaller diameter and it is necessary to bush the shaft of the jig, to fit the larger bores of the other pulleys.

Referring now to the drawings in which the various parts are indicated by numerals:

30 is the cylinder block of an engine from the forward end of which a crank shaft 32, 32A or 32B, as the case may be, projects. Mounted on the projecting end of the crank shaft 32 is a pulley 34; on the crank shaft 32A a pulley 34A; or on the shaft 32B a pulley 34B; all of which are of substantially equal diameter and circumferential identity and drive associated mechanisms through belts, not shown. All three types of pulleys are mounted on and integrally secured to hub sleeves having identical rearwardly projecting portions 36 which are notched for engagement with driving keys 38 carried by the engine shafts, the keys being identically positioned circumferentially of the shaft with relation to the crank pins and inherently occupying a definite position of rotation with relation to the cylinder block when the number one piston is at top dead center.

The shafts 32 and 32A are additionally provided with keyways 40, having identical positioning with relation to the keys 38, and the hub sleeves of pulleys 34 and 34A have complementary keyways extending to the front ends of the shafts and sleeves, the pulleys being additionally driven by keys in such keyways. Above the crank shafts are cap screws 42 which are tapped into the cylinder block 30, these screws also being accurately and identically located in all the engines hereshown.

In accordance with the present invention, 44 is an indicator comprising a plate portion adapted to lie against the end of the cylinder block and to be secured thereto by removing and replacing two of the screws 42 and a pointer portion 44A extending rigidly forward in overlying relation to the rims of the pulleys.

Cooperating with the pointer 44A is a dial plate 46 which has a center or zero mark and equally spaced markings, preferably each a degree of a circle, on opposite sides of the markings, the dial plate being rigidly secured to and movable with the pulley and on the diametrically opposite side of the pulley preferably being counter-balanced. The center or zero marking is so positioned with reference to the pulley that when the number one piston of the engine is at top dead center the pointer 44A will register with the zero marking. Then by use of one of the related side markings, selected in accordance with the specification of the particular engine, before or after dead center, and adjusting the engine distributor so that the number one firing point will occur when the selected marking is in register with the pointer 44A, insurance is had that the number one cylinder, and each of the other cylinders in proper sequence thereafter, will fire such number of degrees in advance of top dead center.

The pulleys 34 and 34A, shown in Figs. 1 and 3, and in more detail in Figs. 6, 7, 8 and 9, and Figs. 13, 14 and 15, in addition to the rearwardly extending sleeve portions 36, have forwardly extending hub portions 47 around the sleeves. The dials 46 are preferably carried by disc sectors 48 having cylindrically arcuate hub portions 48A adapted to be clamped around the pulley hub portions 37 and arcuate cylindrical rim sectors 48B of substantially pulley radius, one of which acts as a counterbalance, the dial being secured as by screws to the other. The dial has slots 46A which permit accurate final adjustment and positioning. The dial carrier is shifted around the hub portion of the pulley to aline the center mark of the dial with the pointer 44A and the hub portions of the dial carrier are clamped thereto, holding the dial 46 in adjacency to the pulley rim and the pointer. Final adjustment of the dial is made by loosening the holding screws, shifting the dial, and tightening the screws.

The pulleys 34B, which do not have forwardly extending sleeve or hub portions, are shown in Fig. 4, and in more detail in Figs. 23, 24 and 25. The dial 46 is preferably carried by an annular disc 50 having a cylindrical rim 50A to which the dial 46 is secured, the dial being secured to the rim by screws and final dial adjustment made as before.

The disc 50 is provided with two holes 50B having centers spaced equally outward from the disc center on a diametral line through the center of the dial 46, the holes 50B and the holes for the dial attaching screws being made during stamping and forming of the disc.

Attachment of the dial carriers and dials to the pulleys 34 and 34A may be made with the pulleys in place on their shafts or removed as conditions or convenience indicate, but attaching difficulties substantially require removal of pulleys 34B from their shafts and the use of a jig, as of the type shown in Figs. 23, 24 and 25, this jig being also usable for positioning the dials of the pulleys 34 and 34A when and if these pulleys be removed from their shafts.

The jig comprises a base 52 which is preferably secured to a suitable table, bench or other support; an upright cylindrical post 54 conforming in diameter to the bore of the pulley 34B and simulating the engine shaft; a lug 56 extending radially from the post and simulating the end of the shaft-carried key 38; and a pointer 58, having the same position relatively to the lug, that the pointer 44A mounted on the cylinder block, has to the key 38, with the number one piston of the engine at top dead center. A bushing sleeve 60, Fig. 28, having a lug-embracing slot 60A is used to enlarge the post diameter to conform to the bores of the pulleys 34 and 34A, when and if the jig be used with such pulleys.

62 is a jig plate having holes therein adapted to receive and be positioned rotationally with reference to the post 54 by locating pins 54A which project upwardly from the end of the post. The jig plate carries downwardly projecting pins 62A which are of proper diameter and spacing to engage the holes 50B in the disc 50 and position that disc and the dial 46 carried thereby with relation to the pointer 58. Preferably the locating pins 54A of the post are aligned with the pointer 58 and the pins 62A are on the line of centers of the locating pin holes in the jig plate. The jig plate has template holes 62B therethrough for drilling registering holes in the dial disc 50 and pulley 34B, which are subsequently tapped for screws which attach the disc to the pulley.

Figs. 10, 11 and 12 show a top dead center finder for installing dial plates on pulleys 34 or 34A while they are in place on the engine shafts without the necessity of uncovering the pistons, the same finder being usable with either type of pulley.

The finder comprises a cylindrical plug 64 having a shouldered end portion 64A of engine shaft diameter which is adapted to nest in the front end of the sleeve 36 in end abutting relation or adjacency to the engine shaft 32 or 32A.

The plug is bored to receive a screw 66 by which it is retained in place in the sleeve, the screw being threaded to engage a threaded hole existing in the end of the shaft and available for temporary use.

Integrally secured to the plug is a lug 68 which is adapted for engagement in the keyway 40 of the engine shaft 32 or 32A and the complementary keyway of the pulley thereover. Also integrally secured to the plug is an oppositely disposed elbowed arm 70, extending radially outward and rearward into proximity to the pointer 44A and having an indicator line 70A for register with such pointer.

In making the finder it is necessary to install the pointer 44A on an engine; remove the cylinder cover over the number one piston and bring that piston to top dead center. A cap screw, which holds the pulley in place, but has no part in the present invention and is not here shown, is removed and the plug inserted with the lug 68 in the groove 40 of the engine shaft and the position of the arm 70 to register with the pointer 44A is determined, the plug is removed and the arm rigidly secured in place. The plug is then replaced and the location of the mark 70A accurately determined, any number desired of the plugs being made from this one setting of the engine piston.

Figs. 17, 18 and 19 show a finder for determining top dead center in engines having pulleys of the type which must be removed from the shaft and which are shown in Figs. 24 and 25 on the jig; and Figs. 20, 21 and 22 a finder for determining top dead center in engines of the other type which may be rearward from the shaft, where the pulleys have been removed, these finders being substantially identical except as to length of barrel and no distinction being therefrom made in the numbering of the parts.

In these views, 72 is a barrel bored to fit the engine shaft and having a notch 72A adapted to engage the lug 38 on the shaft and an arm 74 rotationally positioned with relation to the notch 72A and extending, when on the shaft, into underlying relation to the pointer 44A, the arm having a notch 74A for accurate alignment with the pointer. These finders are constructed, as in the case of the plug type finder before described, with the number one piston uncovered, and the same bolt 66 is used in holding them in place.

In installing top dead center indicators of any type, screws 42, Fig. 16, are removed and the pointer 44—44A positioned and secured by replacing these screws.

With engines of the first two pulley types, without removing the pulleys, the holding screw in the end of the engine shaft, before mentioned, is removed and the plug 64 of the finder shown in Figs. 10, 11 and 12, is inserted in the end of the hub sleeve 36 with the finder lug 68 in the sleeve and shaft groove 40 and the plug secured by the bolt 66. The engine shaft and pulley are then turned until the marking 70A of the plug arm is accurately in register with the pointer 44A and the number one piston is at top dead center. With or without removal of the plug, a dial carrier 48 is placed around the pulley hub 47 and shifted to bring the center of the dial 46 into register with the pointer 44A and the carrier is tightly clamped in place and otherwise secured if desired as by a screw 76, Fig. 9. When this clamping and securing is effected the dial may be slightly out of line with the pointer; if so, the dial securing screws 46C, Figs. 26 and 27, may be loosened and final and accurate shift be made. If not previously done, the finder is then removed.

Pulleys 34B which have no forwardly projecting hub, are removed from the shaft and placed on the jig post 54 with the notch of the hub 36 in engagement with the lug 56. The dial carrier 50 with dial 46 secured thereto is placed on the pulley. The jig plate 62 is engaged with the pins 54A and the plate-carried pins 62A engaged with the holes 50B in the disc of the dial carrier, positioning the dial in alignment with the pointer 58 and providing means for checking the alignment. Using the template holes 62B of the jig plate, the dial carrier disc and pulley web are drilled and at least the web holes tapped and the carrier secured to the pulley by suitable screws or other as desired. After securing, adjustment of the dial plate may be made to provide accurate alignment with the pointer 58; or the top dead center finder of Figs. 21 and 22 may be placed on the engine shaft with the notch 72A in engagement with the end of the engine key 58 and the engine shaft turned to register the notch 74A with the engine carried pointer 44A and position the number one engine piston at top dead center. The finder is removed and the pulley placed on the shaft and final adjustment of the dial 46 made directly with the pointer 44A.

Similarly the pulleys 34 or 34A before placing on the shaft or by removal therefrom may be equipped with dial carriers and dials, by use of the jig, Figs. 24, 25 and 26.

Using the jig, the pulley 34, 34A is placed on the jig post with the notched end of the hub 36 downward and rotationally positioned by engagement of the hub notch with the lug 56 of the post, as is the pulley 34B, placed and engaged in Figs. 24 and 25, the pulley hub portion 47 inherently extending upward, and the top of the jig pointer 58 extending slightly above the pulley as indicated in those views. If necessary, the sleeve, Fig. 28, is used to bush the jig shaft to fit the pulley bore.

The dial carrier 48 is placed on the pulley hub with its hub portion 48A around the pulley hub, the dial 46 is shifted to aline its center mark with the pointer and the carrier hub portions clamped, and if desired, otherwise anchored around the pulley hub and final adjustment made with reference to the jig pointer; or the dead center finder shown in Figs. 17, 18 and 19 is placed on the engine shaft, with the notch 72A engaging the engine shaft key 38 and the shaft turned to register the arm notch 74A and the engine pointer and bring the number one piston to top dead center. The finder is removed and the pulley placed on the engine shaft and the dial position checked and if necessary adjustment made directly with respect to the engine mounted pointer 44A.

I claim:

1. A top dead center indicator for an internal combustion engine which engine is one of a series of identical engines having a cylinder block, cap screws tapped into the front end of said block, reciprocable pistons, a crank shaft connected to said pistons and projecting beyond the front end of said block, and a pulley secured on said shaft in adjacency to said end; said indicator including a plate portion adapted to lie against said end and secured thereto by removal and replacement of a selected pair of said screws, a pointer portion integrally secured to and extending rigidly forward from said plate portion into overlying adjacency to the rim of said pulley, and an indicating mark carried by said pulley adapted for register with said pointer to designate a selected piston top center.

2. A top dead center indicator for an internal combustion engine which engine is one of an identical series having a cylinder block, cap screws tapped into the front end of said block, reciprocable pistons, a crank shaft connected to said pistons and projecting beyond the front end of said block, and a pulley, which includes an extending hub portion, secured on said shaft in adjacency to said end; said indicator including a plate portion adapted to lie against said end and secured thereto by removal and replacement of a selected pair of said screws, a pointer integrally secured to and extending rigidly forward from said plate portion into overlying adjacency to the rim of said pulley, and cooperating indicating means adapted for register with said pointer to designate a selected piston top center; said indicating means including a hub portion adapted to embrace said pulley hub, means for clamping said hub portion on said pulley hub, a disc sector carried by and extending outward from said hub portion, an integral rim sector of substantially pulley rim radius, and an arcuate dial plate secured to said rim sector, said dial plate carrying a zero mark adapted for register with said pointer to designate the desired top piston center.

3. A top dead center indicator in accordance with claim 2, in which said dial plate is secured to said rim sector by screws and the screw holes in said plate are circumferentially elongated to provide adjustment relative to said sector.

4. A top dead center indicator in accordance with claim 2, in which the disc and rim sectors of said indicating means are duplicated on the diametrically opposite side to effect balance of said indicating means.

5. A top dead center indicator for an internal combustion engine which engine is one of an identical series having a cylinder block, cap screws tapped into the front end of said block, reciprocable pistons, a crank shaft connected to said pistons and projecting beyond the front end of said block, and a pulley, which includes an extending hub portion, secured on said shaft in adjacency to said end; said indicator including a plate portion adapted to lie against said end and secured thereto by removal and replacement of a selected pair of said screws, a pointer integrally secured to and extending rigidly forward from said plate portion into overlying adjacency to the rim of said pulley, and cooperating indicating means adapted for register with said pointer to designate a selected piston top center; said indicating means including a hub portion adapted to embrace said pulley hub, means for clamping said hub portion on said pulley hub, a disc sector carried by and extending outward from said hub portion, and an integral rim sector of substantially pulley rim radius, said rim sector carrying a zero mark adapted for register with said pointer to designate the desired top piston center.

6. A top dead center indicator for an internal combustion engine which engine is one of an identical series having a cylinder block, cap screws tapped into the front end of said block, reciprocable pistons, a crank shaft connected to said pistons and projecting beyond the front end of said block, and a pulley, which includes an extending hub portion, secured on said shaft in adjacency to said end; said indicator including a plate portion adapted to lie against said end and secured thereto by removal and replacement of a selected pair of said screws, a pointer integrally secured to and extending rigidly forward from said plate portion into overlying adjacency to the rim of said pulley, and cooperating indicating means adapted for register with said pointer to designate a selected piston top center; said indicating means including a hub portion adapted to embrace said pulley hub, means for clamping said hub portion on said pulley hub, a disc sector carried by and extending outward from said hub portion, and an integral rim sector of substantially pulley rim radius, said rim sector carrying a zero mark adapted for register with said pointer to designate the desired top piston center, and being additionally marked on circumferentially opposite sides of said zero mark to indicate advance or retardation from dead center.

REGINALD R. BEEZLEY.

REFERENCES CITED

The following references are of record in the file of this patent:

UNITED STATES PATENTS

| Number | Name | Date |
| --- | --- | --- |
| 1,449,554 | Schronover | Mar. 27, 1923 |
| 1,461,671 | Page | July 10, 1923 |
| 2,098,058 | Morgan | Nov. 2, 1937 |
| 2,182,519 | Handy et al. | Dec. 5, 1939 |
| 2,218,048 | Meyer | Oct. 15, 1940 |
| 2,443,135 | Glotfitty | June 8, 1948 |